US010650409B1

(12) United States Patent
Smith

(10) Patent No.: US 10,650,409 B1
(45) Date of Patent: May 12, 2020

(54) TECHNIQUES FOR CAPTURING USER INTEREST OF A PRODUCT IN AN ADVERTISEMENT

(71) Applicant: Amazon Technologies, Inc., Seattle, WA (US)

(72) Inventor: Graeme Smith, Dalkeith (GB)

(73) Assignee: Amazon Technologies, Inc., Seattle, WA (US)

( * ) Notice: Subject to any disclaimer, the term of this patent is extended or adjusted under 35 U.S.C. 154(b) by 821 days.

(21) Appl. No.: 14/658,784

(22) Filed: Mar. 16, 2015

(51) Int. Cl.
*G06Q 30/00* (2012.01)
*G06Q 30/02* (2012.01)
*H04W 4/60* (2018.01)
*G05B 19/418* (2006.01)

(52) U.S. Cl.
CPC ..... *G06Q 30/0253* (2013.01); *G06Q 30/0255* (2013.01); *G06Q 30/0267* (2013.01); *G06Q 30/0271* (2013.01); *H04W 4/60* (2018.02)

(58) Field of Classification Search
CPC .......... G06Q 30/0253; G06Q 30/0255; G06Q 30/0267; G06Q 30/0271; H04W 4/60
See application file for complete search history.

(56) References Cited

U.S. PATENT DOCUMENTS

| 9,632,676 B1* | 4/2017 | Gindi | G06F 16/252 |
| 2008/0119167 A1* | 5/2008 | Rao | G06Q 30/02 455/411 |
| 2010/0241507 A1* | 9/2010 | Quinn | G06Q 30/02 705/14.42 |
| 2012/0095828 A1* | 4/2012 | Evankovich | G06Q 10/00 705/14.49 |
| 2013/0262218 A1* | 10/2013 | Wang | G06Q 30/02 705/14.43 |

OTHER PUBLICATIONS

Macy's website. 2013-2015. WayBackmachine. http://www1.macys.com/shop/shoes/shoe-trends?id=39395&edge=hybrid (Year: 2013).*
Macys website 2013-2015-N. 2 -WayBackmachine (Year: 2014).*
"An Overview of Computational Challenges in Online Advertising". Chatwin. 2013 (Year: 2013).*

* cited by examiner

*Primary Examiner* — Maria V Vanderhorst
(74) *Attorney, Agent, or Firm* — Kilpatrick Townsend & Stockton LLP

(57) ABSTRACT

An advertisement request identifying a user may be received by a computing device of an electronic marketplace provider. User information for the user may be determined based on the advertising request. An advertisement featuring an item offered on an electronic marketplace may be selected. The advertisement may be provided for placement within content of a third-party network page provider. A first plurality of user input options configured to elicit a level of interest of the user with respect to the first advertisement may also be provided within the content of the third-party network page provider. User interaction information indicating the level of interest of the user with respect to the advertisement may be received. A second plurality of user input options may be determined based on the item of the advertisement and the first plurality of user input options. The second plurality of user input options may be provided to the content.

19 Claims, 9 Drawing Sheets

TECHNIQUES FOR CAPTURING USER INTEREST OF A PRODUCT IN AN ADVERTISEMENT

BACKGROUND

It has become common for electronic marketplace providers to bid on advertisement space within third-party provider websites. Upon winning a bid for the advertisement space, the electronic marketplace provider can present an advertisement for an item (e.g., a good or service) to be displayed within the content of the third-party provider website. As a user peruses the Internet, it can become frustrating to be served the same advertisement repeatedly. Frustration may be further increased when the user has no interest in advertisements of the type presented. This may lead users to ignore the advertisements causing a loss in potential sales for the merchant of the item. Conventional techniques can make it difficult for a user to control the content of the advertisements presented to him. This lack of control negatively affects the user experience as well as reduces the chance of eventual sales for the merchant.

BRIEF DESCRIPTION OF THE DRAWINGS

Various embodiments in accordance with the present disclosure will be described with reference to the drawings, in which.

DETAILED DESCRIPTION

Figure 1:
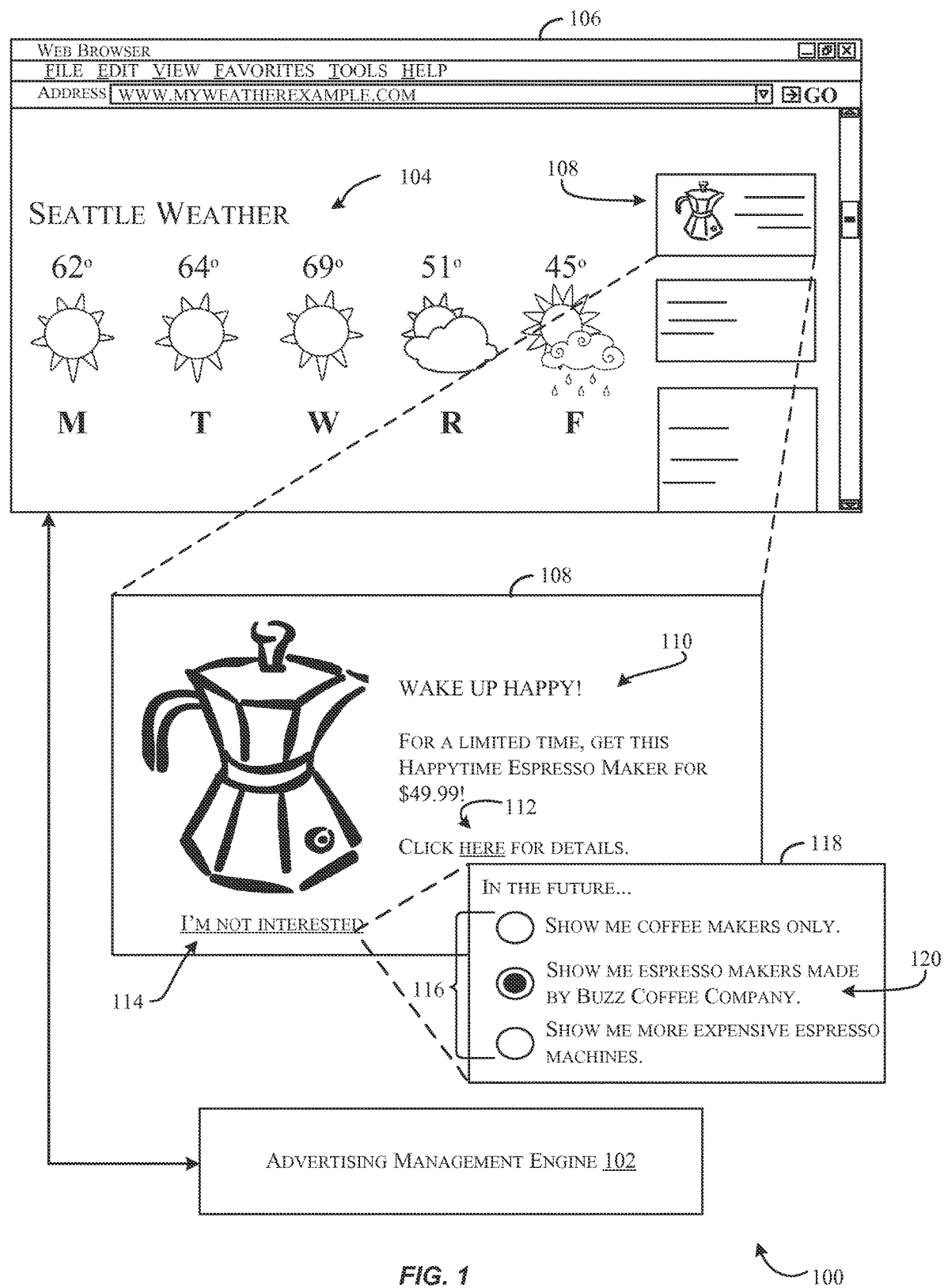
FIG. 1 is a schematic diagram illustrating an example environment suitable for implementing aspects of an advertising management engine, in accordance with at least one embodiment.

Techniques described herein are directed to capturing user interest in advertisements. In some examples, the advertisements may be provided by an electronic marketplace provider for display on a third-party network page provider. In some examples, an electronic marketplace provider may include a provider of an electronic catalogue of items (e.g., goods or services) that includes items offered by the electronic marketplace provider and/or items offered by third-party merchants. The catalogue may direct customers to content that enables the customer to order items from the electronic marketplace provider or, alternatively, from the third-party merchants. In some examples, the content may only include offers from third-party merchants and may only route the customer to the third-party merchants (e.g., in exchange for a referral fee or the like). In at least one example, a system may be configured to provide advertisements that include user input options to capture user interest. The system may also receive an advertisement request from a third-party content provider. User input options, in some cases, may include user interface components that can be used to elicit a user's interest in an advertisement. For example, user input options may relate to various aspects of an item including, but not limited to, a level of interest in the item or category of items, a manufacturing material, a manufacturer, an item color, pricing information, shipping information, consumer ratings, and/or merchant information, to name a few.

For example, a user may visit a third-party provider network page (e.g., a webpage for ascertaining the weather). The webpage may include advertisement space that may be bid upon by advertisement providers (e.g., the electronic marketplace provider, other third-party providers, etc.). Upon winning the bid, the electronic marketplace provider may receive an advertisement request (e.g., from a third-party content provider) that includes user identification information, for example, a name, an address, or an advertisement number associated with the user. Of course, users may be required to opt-in or be given the option to opt-out before having their personal information shared. In response to the advertisement request, the electronic marketplace provider may select an advertisement (e.g., a television advertisement) to be presented to the user on the third-party provider's network page. The selection of the advertisement may be based upon the user information. The user information may include browsing history, purchase order history, return history, and/or user preferences associated with the user. In one example, the television advertisement may be selected due to the browsing history of the user. For instance, the user may have viewed ten webpages in the last two weeks that each featured a television for sale.

In addition to providing the advertisement featuring a television, the electronic marketplace provider may determine a number of user input options to provide with the advertisement. For example, the user may be presented an option of indicating that he is not interested in the particular television featured in the current advertisement. Further input options may be provided to the user that enable the user to indicate additional information as to why he is not interested in the current television. For example, the current television is manufactured by company X. In this case, a user input option may be provided to the user to enable him to indicate that he would prefer to see televisions that are manufactured by another company (e.g., company Y). This input option may be available to the user due to his browsing history indicating that at least one of the ten televisions he has viewed in the past two weeks were manufactured by company Y or that he has recently purchased and/or given a positive review for another item manufactured by company Y. Thus, subsequent advertisements provided to the user by the electronic marketplace may feature televisions manufactured by company Y. Additionally, or alternatively, the electronic marketplace may prevent advertisements for televisions manufactured by company X from being presented to the user going forward.

In accordance with one embodiment, the purchase history of a user may indicate that the user often buys relatively expensive items (e.g., items that are priced above $200). Upon receiving an advertisement request for the user, the electronic marketplace may determine a number of user input options to be provided with an advertisement that include a number of pricing options. For example, while the current advertisement may include an item that is priced at $40, the user input options may enable the user to indicate that she wishes to view items that are higher priced (e.g., greater than $200). The electronic marketplace provider may use such information when making subsequent advertisement selections for the user. Thus, a subsequent advertisement presented to the user might feature an item that is priced at $250, for example.

Referring now to the drawings, in which like reference numerals represent like parts, FIG. 1 is a schematic diagram illustrating an example environment 100 suitable for implementing aspects of an advertisement management engine 102, in accordance with at least one embodiment. For example, content 104 may be provided by a third-party provider on webpage 106. For example, content 104 may be weather-related information such as a 5-day forecast for Seattle, Wash. Webpage 106 may include advertisement space that is suitable for displaying one or more advertisements, for example, advertisement 108. Once the user has navigated to webpage 106, or at any suitable time, advertisement management engine 102 may receive an advertisement request from the third-party provider. Advertisement management engine 102 may utilize information provided in the request to select advertisement 108 as well as various user input options (e.g., indicated by hyperlink 114 and radio buttons 116). Advertisement 108 may include, but is not limited to, any suitable combination of text, images, hyperlinks, radio buttons, check boxes, and the like. Advertisement 108, in this example, includes text 110 and hyperlink 112. Hyperlink 112 may provide the user the ability to navigate to another webpage, for example, a details page on the electronic marketplace dedicated to the advertised espresso machine. The espresso machine may be provided by an electronic marketplace provider on the electronic marketplace as part of a catalogue of items offered for consumption.

In at least one embodiment, the advertisement 108 may include one or more user input options such as hyperlink 114 and radio buttons 116. Hyperlink 114 and radio buttons 116 are used for illustrative purposes only. It should be understood that any mechanism for enabling the user to input data or to indicate a selection may be utilized. These user input options may be determined by advertisement management engine 102 based on information associated with the user. For example, the advertisement 108 may be selected by advertisement management engine 102 as part of a marketing campaign. Additionally, the user may have been recently searching the electronic marketplace for various espresso machines manufactured by "Happy-time" or "Buzz Coffee Company." Given the user's browsing history, advertisement management engine 102 may provide the user various user input options (e.g., radio buttons 116), including user input option 120.

As a specific example, the user may select the hyperlink 114 to indicate that he is not interested in the espresso machine advertised in advertisement 108. Upon selection of hyperlink 114, dialog box 118 may be displayed to the user. Dialog box 118 is used for illustrative purposes only. User input options may alternatively be presented in line with the advertisement 108 as will be discussed later in FIG. 4. The user may utilize dialog box 118 and radio buttons 116 to indicate further information related to his disinterest. As discussed above, the user may not be interested in the manufacturer of the espresso machine presented in the advertisement 108. In this case, the user may select the user input option 120 to indicate that, if he is presented with another advertisement of an espresso machine, he would prefer that the advertisement include espresso machines manufactured by Buzz Coffee Company. Advertisement management engine 102 may utilize the information provided by the user's selection of the user input option 120 to determine subsequent advertisements as well as subsequent user input options to provide to the user.

Figure 2:
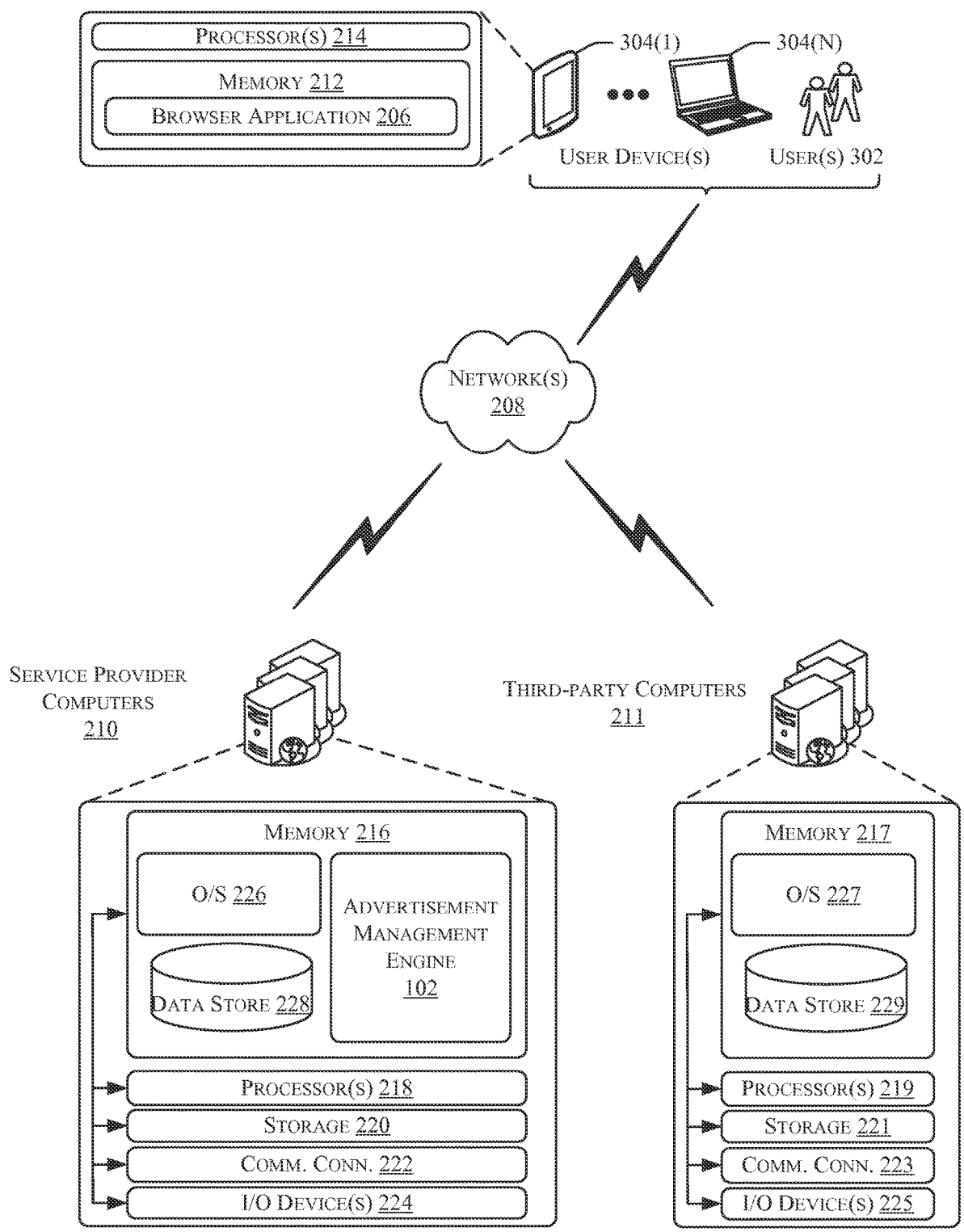
FIG. 2 illustrates an example architecture for providing advertisements and user input options to a user on a third-party network page, in accordance with at least one embodiment.

FIG. 2 illustrates an example architecture 200 for providing advertisements and user input options to a user on a third-party network page, in accordance with at least one embodiment. In architecture 200, one or more users 202 may utilize user computing devices 204(1)-(N) (collectively, user computing devices 204) to access a browser application 206 (e.g., a browsing application capable of presenting a network page provided by service provider computers 210 and third-party computers 211) or a user interface accessible through the browser application 206 via one or more networks 208. In some aspects, the browser application 206 may be hosted, managed, and/or provided by a computing resources service or service provider, such as by utilizing one or more service provider computers 210. The one or more service provider computers 210 may, in some examples, provide computing resources such as, but not limited to, client entities, low latency data storage, durable data storage, data access, management, virtualization, cloud-based software solutions, electronic content performance management, etc. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks, and other private and/or public networks. While the illustrated example represents the users 202 accessing the browser application 206 over the networks 208, the described techniques may equally apply in instances where the users 202 interact with the service provider computers 210 via the one or more user computing devices 204 over a landline phone, via a kiosk, or in any other suitable manner. It should be appreciated that the described techniques may apply in other client/server arrangements (e.g., set-top boxes, etc.), as well as in non-client/server arrangements (e.g., locally stored applications, etc.).

As described briefly above, the browser application 206 may allow the users 202 to interact with the service provider computers 210 such as to access information associated with items provided in an electronic marketplace. Additionally, browser application 206 may allow the users 202 to interact with the third-party computers 211 such as to access one or more network pages provided by the third-party computers 211. The one or more service provider computers 210, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users 202 and serving, in response, various user interfaces that can be rendered at the user computing devices 204 such as, but not limited to, perceived latency or the like. The browser application 206 can present any suitable type of website that supports user interaction, including search engine sites. As discussed above, the described techniques can similarly be implemented outside of the browser application 206, such as with other applications running on the user computing devices 204.

The user computing devices 204 may be any suitable type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user computing devices 204 may be in communication with the service provider computers 210 or third-party computers 211 via the networks 208, or via other network connections. Additionally, the user computing devices 204 may be part of the distributed system managed by, controlled by, or otherwise part of the service provider computers 210 or third-party computers 211.

In one illustrative configuration, the user computing devices 204 may include at least one of memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user computing device, the memory 212 may be volatile (such as random access memory (RAM)) and/or non-volatile (such as read-only memory (ROM), flash memory, etc.). The user computing devices 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein including at least the perceived latency, such as via the browser application 206 or dedicated applications (e.g., smart phone applications, tablet applications, etc.). The browser application 206 may be configured to receive, store, and/or display a network page or other interface for interacting with the service provider computers 210 or the third-party computers 211. Additionally, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 210 or the third-party computers 211 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 210 or third-party computers 211 may be in communication with the user computing devices 204 and/or other service providers via the networks 208 or via other network connections. The service provider computers 210 or third-party computers 211 may include one or more servers, perhaps arranged in a cluster, as a server farm, or as individual servers not associated with one another. These servers may be configured to implement the content performance management described herein as part of an integrated, distributed computing environment.

In one illustrative configuration, the service provider computers 210 and third-party computers 211 may include, respectively, at least one of memory 216 and at least one of memory 217 and one or more processing units (e.g., processor(s) 218 or processor(s) 219). The processor(s) 218 and the processor(s) 219 may be implemented as appropriate in hardware, computer-executable instructions, firmware, or combinations thereof. Computer-executable instruction or firmware implementations of the processor(s) 218 and the processor(s) 219 may include computer-executable or machine-executable instructions written in any suitable programming language to perform the various functions described.

The memory 216 and the memory 217 may store program instructions that are loadable and executable on the processor(s) 218 and the processor(s) 219, as well as data generated during the execution of these programs. Depending on the configuration and type of service provider computers 210 and third-party computers 211, the memory 216 and the memory 217 may be volatile (such as RAM) and/or non-volatile (such as ROM, flash memory, etc.). The service provider computers 210 and third-party computers 211 may also include additional storage 220 and additional storage 221, which may include removable storage and/or non-removable storage. The additional storage 220 and additional storage 221 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 216 and the memory 217 may include multiple different types of memory, such as SRAM, DRAM, or ROM.

The memory 216, the memory 217, the additional storage 220, the additional storage 221, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216, the memory 217, the additional storage 220, and the additional storage 221 are all examples of computer storage media. Additional types of computer storage media that may be present in the service provider computers 210 and third-party computers 211 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210 or third-party computers 211. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 and third-party computers 211 may also contain communications connection(s) 222 and communication connection(s) 223 that allow the service provider computers 210 and third-party computers 211 to communicate with a stored database, another computing device or server, user terminals and/or other devices on the networks 208. The service provider computers 210 and third-party computers 211 may also include I/O device(s) 224 and I/O device(s) 225, such as a keyboard, a mouse, a pen, a voice input device, a touch input device, a display, speakers, a printer, etc.

Turning to the contents of the memory 216 and the memory 217 in more detail, the memory 216 and the memory 217 may include, respectively, an operating system 226 and an operating system 227, one or more data stores 228 and one or more data stores 229, and/or one or more application programs, modules, or services for implementing the features disclosed herein including advertisement management engine 102 of FIG. 1.

Figure 3:
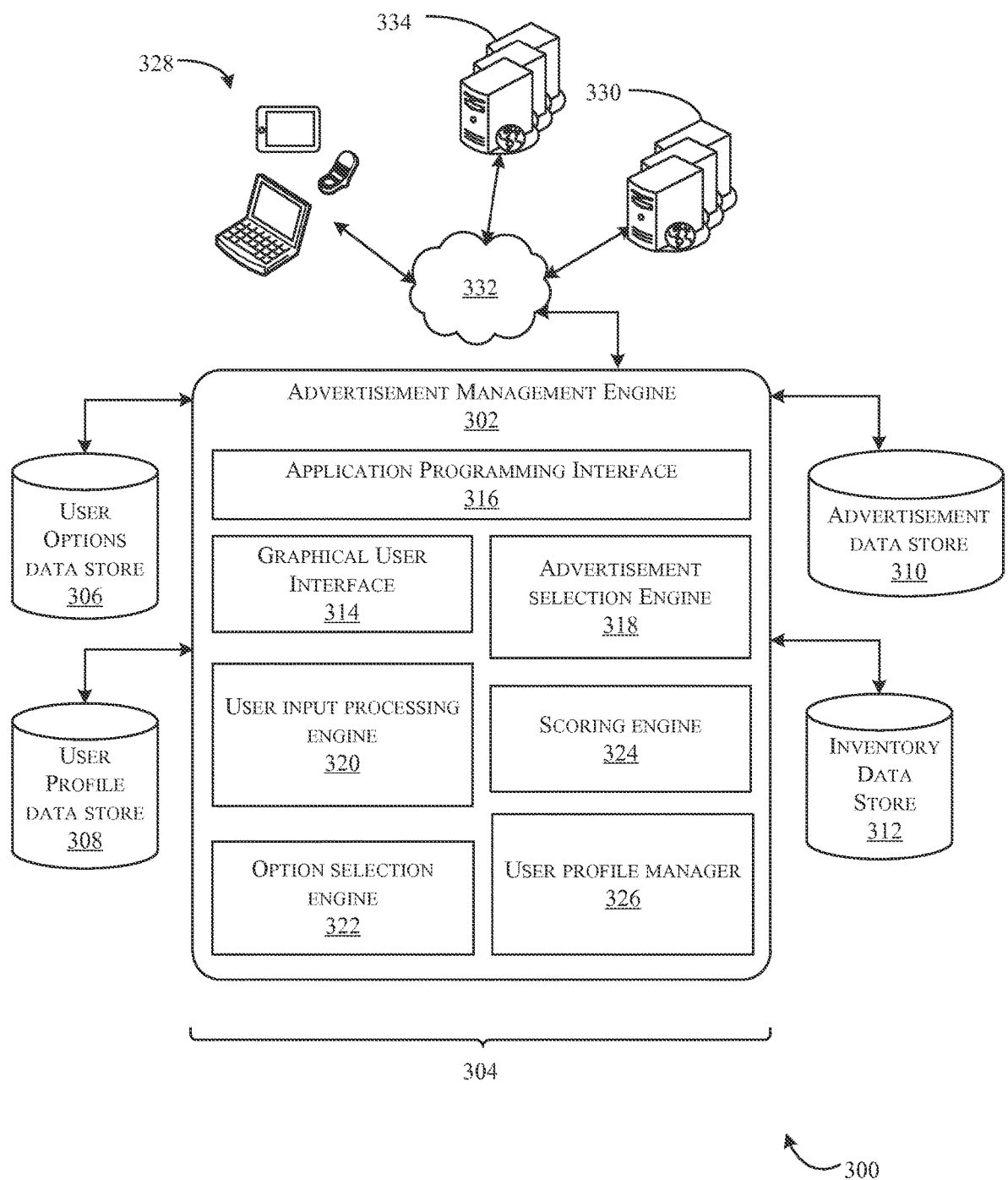
FIG. 3 schematically illustrates an example computer architecture for the advertisement management engine including a plurality of modules that may carry out various embodiments.

FIG. 3 schematically illustrates an example computer architecture 300 for the advertisement management engine 302 (e.g., the advertisement management engine 102) including a plurality of modules that may carry out various embodiments. The modules 304 may be software modules, hardware modules, or a combination thereof. If the modules 304 are software modules, the modules 304 can be embodied on a computer readable medium and processed by a processor in any of the computer systems described herein. It should be noted that any module or data store described herein, may be, in some embodiments, a service responsible for managing data of the type required to make corresponding calculations. The modules 304 may be configured in the manner suggested in FIG. 3 or the modules 304 may exist as separate modules or services external to the advertisement management engine 302.

In the embodiment shown in the drawings, a user options data store 306, a user profile data store 308, an advertisement data store 310, and an inventory data store 312 are shown, although data can be maintained, derived, or otherwise accessed from various data stores, either remotely or locally, to achieve the functions described herein. The advertisement management engine 302, shown in FIG. 3, includes various modules such as a graphical user interface 314, an application programming interface 316, an advertisement selection engine 318, a user input processing engine 320, an option selection engine 322, a scoring engine 324, and a user profile manager 326. Some functions of these modules are described below. However, for the benefit of the reader, a brief, non-limiting description of each of the modules is provided in the following paragraphs.

In accordance with at least one embodiment, a process is enabled for utilizing advertisement management engine 302. For example, a user (e.g., a consumer) may utilize one or more devices 328 to interact with service provider computers 330 (e.g., the service provider computers 210) to receive information pertaining to a particular item offered for consumption on an electronic marketplace provided by service provider computers 330. Service provider computers 330 may be configured to communicate with networks 332 (e.g., the networks 208).

In accordance with at least one embodiment, the user may peruse the electronic marketplace using one or more devices 328. In some instances, the user may purchase items from the electronic marketplace. Additionally, the user may return items to a provider of the item by utilizing one or more devices 328 to initiate a return order.

As the user interacts with the electronic marketplace, or at any suitable time, browsing information, purchase information, and return history information may be received by advertisement management engine 302 via application programming interface 316 and graphical user interface 314, both components of advertisement management engine 302. It should be appreciated that the networks 332 may be the same or similar as the networks 208 described in connection with FIG. 2. Application programming interface 316 and/or graphical user interface 314 may be utilized in any suitable example described herein as a means for receiving information by the advertisement management engine 302. Browsing information, purchase information, and return history information may be received by the user profile manager 326. User profile manager 326, a component of the advertisement management engine 302, may store user information in user profile data store 308, or in any suitable storage location. User profile data store 308 may be a storage system internal or external to the advertisement management engine 302. User profile data store 308 may store user information utilizing customer information such as name or address, or user profile data store 308 may store user information using another suitable form of identification (e.g., a unique advertising number).

In accordance with at least one embodiment, a user (e.g., a consumer) may utilize one or more devices 328 to interact with third-party computers 334 (e.g., the third-party computers 211) to receive information pertaining to a webpage. Third-party computers 334 may be configured to communicate with networks 332 (e.g., the networks 208). In at least one example, a user may navigate to a webpage provided by third-party computers 334. Such navigation may lead to an advertisement space bidding process that includes information exchanges between service provider computers 330 and third-party computers 334. Upon winning advertisement space through such a bidding process, or at any suitable time, an advertisement request may be received by advertisement selection engine 318, a component of advertisement management engine 302. In at least one example, an electronic marketplace provider may purchase advertisement space on the third-party computers 334 as part of a bulk advertisement space purchase. Thus, the electronic marketplace provider may own space on the webpage provided by the third-party computers 334 for particular days and times, for example. In accordance with at least one embodiment, an advertisement request may be received by advertisement selection engine 318 due to the occurrence of the particular day and time during which the electronic marketplace provider owns advertisement space.

In accordance with at least one embodiment, advertisement selection engine 318 may interact with advertisement data store 310, a data store responsible for storing a number of potential advertisements. Additionally, advertisement selection engine 318 may interact with user profile data store 308 to ascertain user information. Such user information may be utilized by advertisement selection engine 318 in selecting a particular advertisement to provide in response to the advertisement request. Upon selecting a particular advertisement, the advertisement selection engine 318 may interact with option selection engine 322, for example, by providing the selected advertisement to option selection engine 322.

In accordance with at least one embodiment, option selection engine 322, a component of the advertisement management engine 302, may be responsible for selecting a number of user input options to include with the selected advertisement. The advertisement and user input options may be provided in response to the advertisement request. Option selection engine 322 may interact with user profile data store 308 to ascertain user information. Alternatively, option selection engine 322 may receive user information from advertisement selection engine 318. Option selection engine 322 may interact with user options data store 306, a data store responsible for storing a number of user input options. Option selection engine 322 may interact with inventory data store 312, a data store responsible for storing item information for an electronic catalogue of items provided by the electronic marketplace provider. Using user information and information about the item featured in the selected advertisement, option selection engine 322 may select a number of user options from user options data store 306.

In accordance with at least one embodiment, scoring engine 324, a component of the advertisement management engine 302 may interact with user profile data store 308 and option selection engine 322. The scoring engine 324 may be responsible for scoring a number of user input options. The scoring engine 324 may receive user information from option selection engine 322. Alternatively, the scoring engine 324 may obtain such information from user profile data store 308.

In accordance with at least one embodiment, user input processing engine 320, a component of the advertisement management engine 302, may receive data related to a selection of a user input option by a user. For example, a selected advertisement, along with a selected number of user input options, may have been presented to the user on a webpage provided by third-party computers 334. User input options selections by the user may be received by user input processing engine 320. User input processing engine 320 may interact with advertisement data store 310 or user profile data store 308 to store information related to user input option selections.

Figure 4:
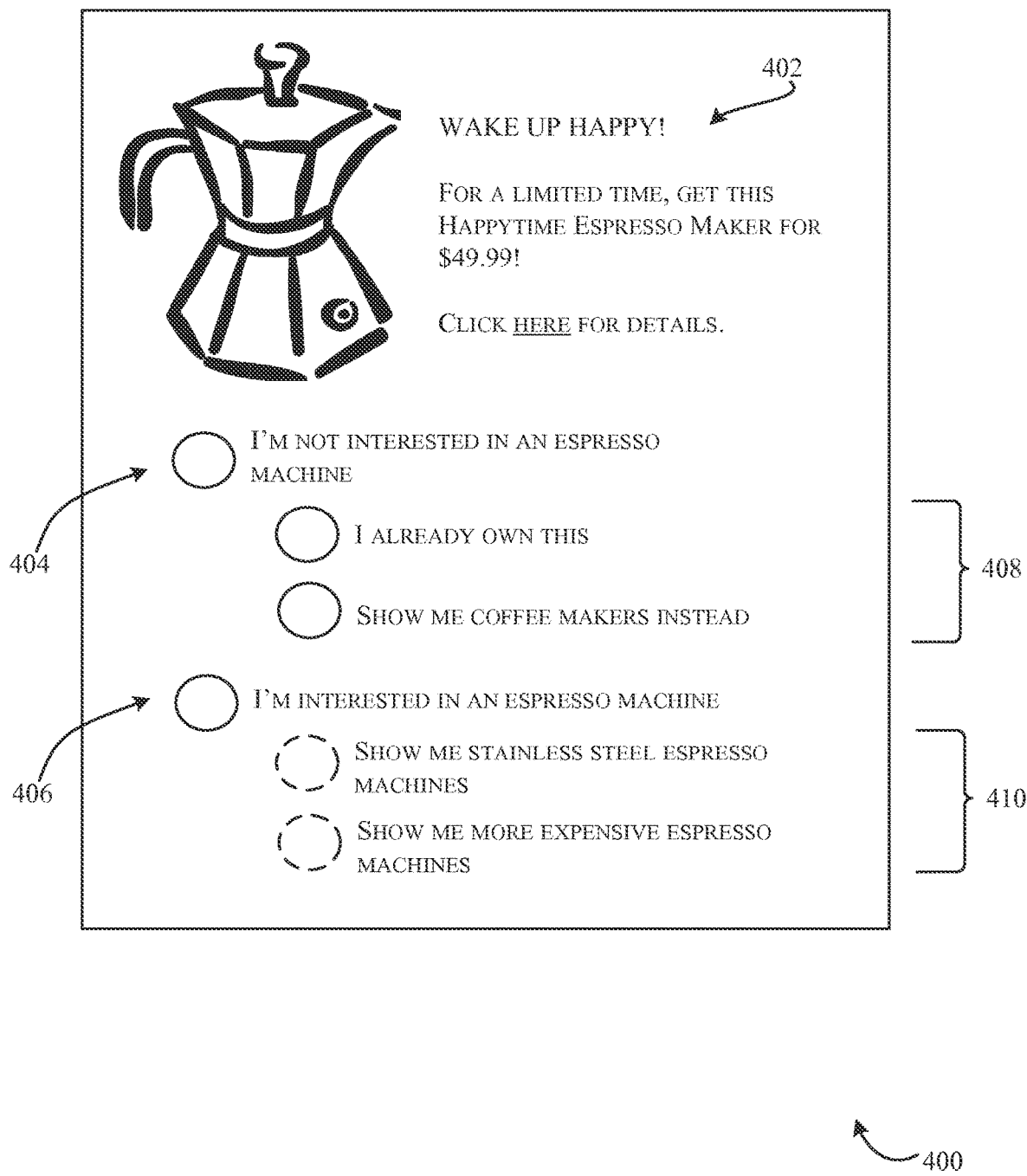
FIG. 4 illustrates an example environment provided by the advertisement management engine to capture user interest with respect to an advertisement, in accordance with at least one embodiment.

FIG. 4 illustrates an example environment 400 provided by an advertisement management engine (e.g., the advertisement management engine 302 of FIG. 3) to capture user interest with respect to an advertisement, in accordance with at least one embodiment. Advertisement 402 may include similar, or different, content as advertisement 108 of FIG. 1. In at least one example, an advertisement management engine (e.g., the advertisement management engine 302 of FIG. 3) may select the advertisement 402. Selection of the advertisement may be based on user information including information stored in user profile data store 308. For example, a user may have recently viewed a number of coffee makers and espresso machines on an electronic marketplace. An advertisement for an espresso machine may be selected by the advertisement selection engine 318 based on the browsing information of the user and, for example, a determination that the browsing occurred within a threshold amount of time (e.g., the last week, the last day, the last hour, etc.).

In accordance with at least one embodiment, a number of user input options (e.g., user input option 404 and user input option 406 may be provided with the advertisement 402. Such user input options may be determined by, for example, option selection engine 322 of FIG. 3. It should be understood that user input option 404 and user input option 406 are used for illustrative purposes only. Any number of user input options may be utilized. Each of user input option 404 and user input option 406 are intended to elicit a level of interest of the user with respect to the featured item of the advertisement. While user input option 404 and user input option 406 are depicted as radio buttons, other user interface elements may be utilized to achieve the same goal (e.g., check boxes, drop down menu items, free form text fields for the user to enter text, etc.).

In accordance with at least one embodiment, upon selection of user input option 404, or at another suitable time, option selection engine 322 may determine an additional number of user input options, for example, user input options 408. In at least one example, user selection of user input option 404 may cause user input options 408 to be provided. Prior to the user's selection of user input option 404, user input options 408 may not have been displayed. Similarly, user input options 410 may not appear to the user until user input option 406 has been selected.

In accordance with at least one embodiment, the number of user input options 408 may vary. The number and order of user input options 408 may be determined, for example, by option selection engine 322. Option selection engine 322 may identify a number of potential user input options based on the user's selection of user input option 404. Further, option selection engine 322 may determine, using user information obtained from user profile data store 308, that the user has viewed several different espresso machines and coffee makers in the past. A number of potential user input options may be identified, though not every user input option identified may be displayed to the user. In at least one example, scoring engine 324 may score the number of potential user input options according to a relevance score related to the user information (e.g., browsing information, purchase history, or return history).

For example, scoring engine 324 may take into account that while the user has viewed various espresso machines and coffee makers, he has also discontinued viewing these types of items some time ago (e.g., several days or the like). Thus, the scoring engine 324 may determine that a user input option for "I already own this" may be more relevant to display to the user than an option to "show me espresso machines made by Company X." Additionally, or alternatively, scoring engine 324 may determine that the number of coffee makers viewed by the user exceeded the number of espresso machines viewed. Accordingly, the scoring engine 324 may identify "show me coffee makers instead" as a further user input option. User input options 408 are mere examples; any number of user input options may be identified and presented to the user. The purpose of such user input options include ascertaining information as to the reason(s) for the user's disinterest and/or ascertaining information with which to select other items that may be of greater interest to the user.

In accordance with at least one embodiment, option selection engine 322 may identify a number of potential user input options based on the user's selection of user input option 406. For example, option selection engine 322 may determine, using user information obtained from user profile data store 308, that the user has viewed several stainless steel espresso machine models. Additionally, the option selection engine 322 may determine that the user has typically viewed items that are more expensive or that have a higher rating or review score than the current item being advertised. Thus, in a similar manner as described above, a number of potential user input options may be identified, scored, and provided, though not every user input option identified may be displayed to the user.

Figure 5:
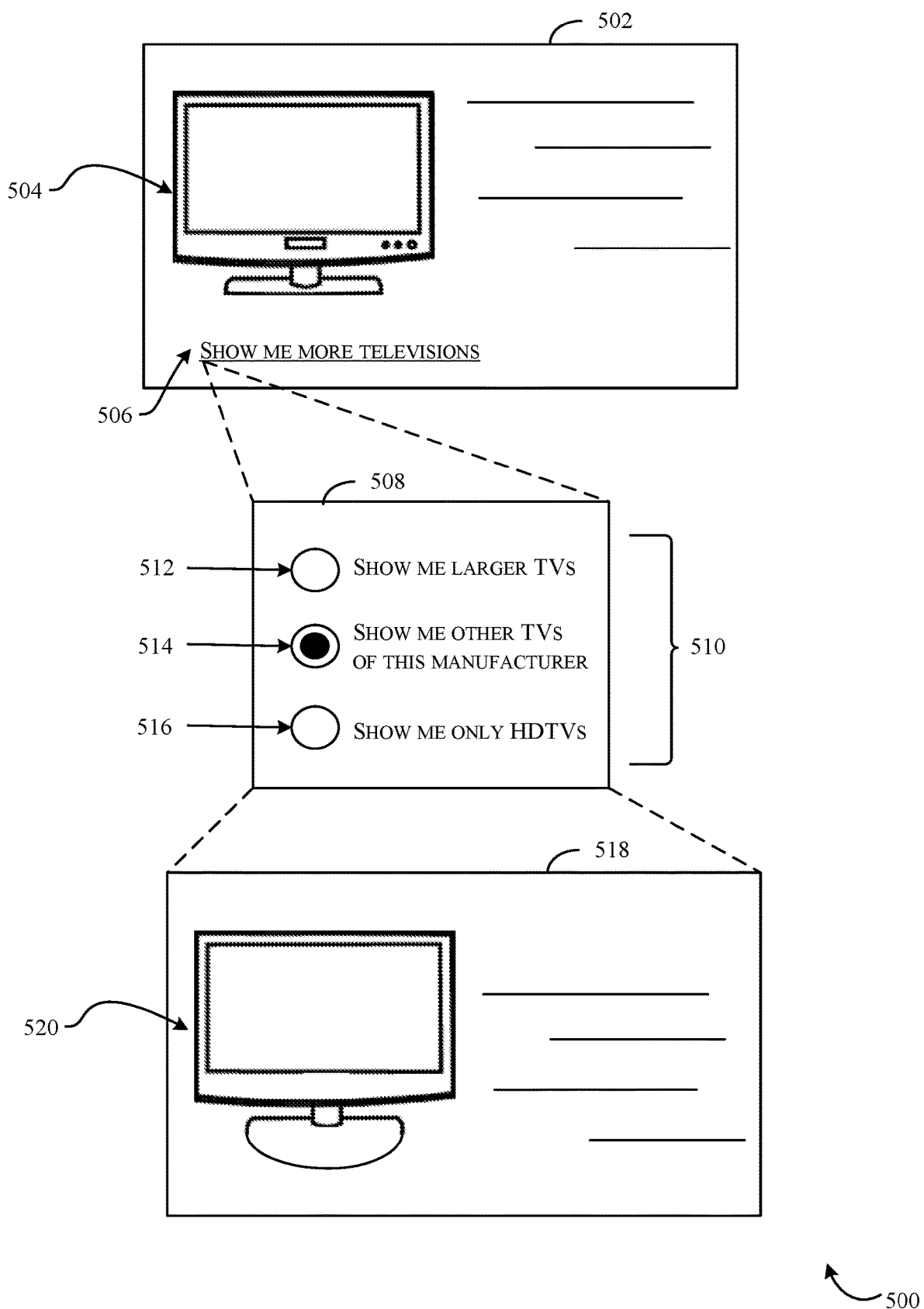
FIG. 5 illustrates an example environment provided by the advertisement management engine to capture user interest with respect to an advertisement, in accordance with at least one further embodiment.

FIG. 5 illustrates an example environment 500 provided by the advertisement management engine (e.g., the advertisement management engine 302 of FIG. 3) to capture user interest with respect to an advertisement, in accordance with at least one further embodiment. For example, the user may be provided with an advertisement 502. Advertisement 502 may feature a television 504. User input option 506, labeled "Show me more televisions," may be provided to elicit a level of interest the user has with the television 504. User input option 506 is used for illustrative purposes only, and any manner of user interface may be utilized including, but not limited to, drop down menus, check boxes, text boxes, and buttons.

In accordance with at least one embodiment, upon selection of user input option 506, a dialog box 508 may be displayed to the user. Dialog box 508 may include a number of user input options 510. For example, user input option 512 may be provided to enable the user to indicate that he wishes to see advertisements featuring larger televisions than the television featured in advertisement 502. User input option 514 may be provided to enable the user to indicate that he wishes to see advertisements featuring other televisions having the same manufacturer as the television featured in advertisement 502. User input option 516 may be provided to enable the user to indicate that he wishes to see advertisements featuring high definitions televisions (HDTVs) only.

As an illustrative example only, user input option 512 may be provided based on the user's browsing history. For example, the user's browsing history may indicate that the user has previously searched for televisions that were larger than the television 504. User input option 514 may be provided based on browsing history and purchase history. For example, the user may have not only searched for a number of TVs of the same brand, but additionally, the user may have purchased another television, or other electronic device, of the same brand as television 504. User input option 516 may be based on browsing history and purchase history. For example, user input option 516 may be provided based on previous searches made by the user for HDTVs and/or a previous purchase of an HDTV by the user.

In accordance with at least one embodiment, user input options may be based on item information associated with the feature item. For example, an item may be associated with item information (e.g., item characteristics) including, but not limited to, one or more colors, one or more sizes, a manufacturing material, a price, a manufacturer, one or more consumer reviews, a sales history, a merchant, one or more item features, and the like. User input options may be identified based on such item characteristics. Once identified, the user input options may be determined according information associated with the item and/or information associated with other items in the electronic marketplace.

As a non-limiting example, television 504 may be associated with a size (e.g., 32 inches), a manufacturer (e.g., "XYZ"), and an item feature (e.g., High Definition). It may be determined that more users purchase televisions that are larger than 32 inches than those that purchase televisions that are smaller than 32 inches. Additionally, it may be determined that high definition televisions sell more often than standard definition televisions. Further, it may be determined that consumers tend to take the manufacturer of an item into account when making purchasing decisions. Such information may be determined from information associated with the item (e.g., television 504) and/or information associated with other items in the electronic marketplace (e.g., other televisions other than television 504). Thus, user input options 510 may be identified and scored based on the information associated with television 504, purchase history of television 504, purchase history of other televisions offered in the electronic marketplace, and a collective of consumer reviews related to various televisions offered in the electronic marketplace. The user input option score may indicate a relevance between the user input option and the featured item (e.g., television 504). User input options 510 may be sorted and provided according to the score.

In accordance with at least one embodiment, selection information of a user input option may be received, for example, by the user input processing engine 320 of FIG. 3. For example, user selection of user input option 506 may be received by user input processing engine 320. User input processing engine 320 may interact with option selection engine 322. Option selection engine 322, based on the selection of user input option 506, may identify a number of additional user input options to be displayed to the user, including user input options 510. Option selection engine 322 and/or user input processing engine 320 may interact with scoring engine 324 to determine particular user input options to be displayed to the user (e.g., user input options 510). Alternatively, all of the identified user input options may be displayed to the user (e.g., using the dialog box 508, using a drop down menu, or using any suitable user interface mechanism described herein). User selection of user input option 514, for example, may be received by user input processing engine 320.

Upon selection of a user input option, user input processing engine 320 may modify information related to the user. For example, the user may select the user input option 506 to indicate that he is interested in seeing more advertisements for televisions. As a result of this selection, the user may be provided with user input options 510. The user may select the user input option 514 to indicate that he wishes to see other televisions manufactured by the same manufacturer as the featured television in advertisement 502. These selections may be received by user input processing engine 320. This information may be stored, by user input processing engine 320, as part of a user profile stored in, for example, user profile data store 308 of FIG. 3. Thus, advertisement selection engine 318 of FIG. 3 may utilize these stored user input option selections when determining a subsequent advertisement to provide to the user.

In accordance with at least one embodiment, following the process described above, the user may navigate to another webpage of another third-party provider or a same third-party provider. Alternatively, the user may end their browsing session and resume browsing at another time. In either case, upon navigating to another third-party provider webpage, a new advertisement request may be received by advertisement management engine 302. Alternatively, a scripting language embedded within advertisement 502 may cause an additional advertisement request to be received by advertisement management engine 302. The request may be received independent from a navigational action of the user (e.g., due to an executed script associated with advertisement 502). Upon receipt of the advertisement request, the process described above may be repeated, this time, utilizing the previously selected user input options to determine the subsequent advertisement and a number of user input options to provide with the subsequent advertisement. Continuing with the example above, subsequent advertisement 518 may feature television 520, a television manufactured by the same manufacturer as television 504 according to the user's selection of user input option 514.

In accordance with at least one embodiment, in response to one or more user input options being selected by the user, or at any suitable time, a script associated with the advertisement 502 may cause an advertisement request to be generated. The advertisement request may result in a subsequent advertisement being displayed in the same space as advertisement 502. In other words, the advertisement 502 may be replaced with the subsequent advertisement requested via script. The user, in such cases, may be still viewing the webpage. Thus, it may not be necessary for the user to navigate away from the webpage in order to be served a subsequent advertisement.

Figure 6:
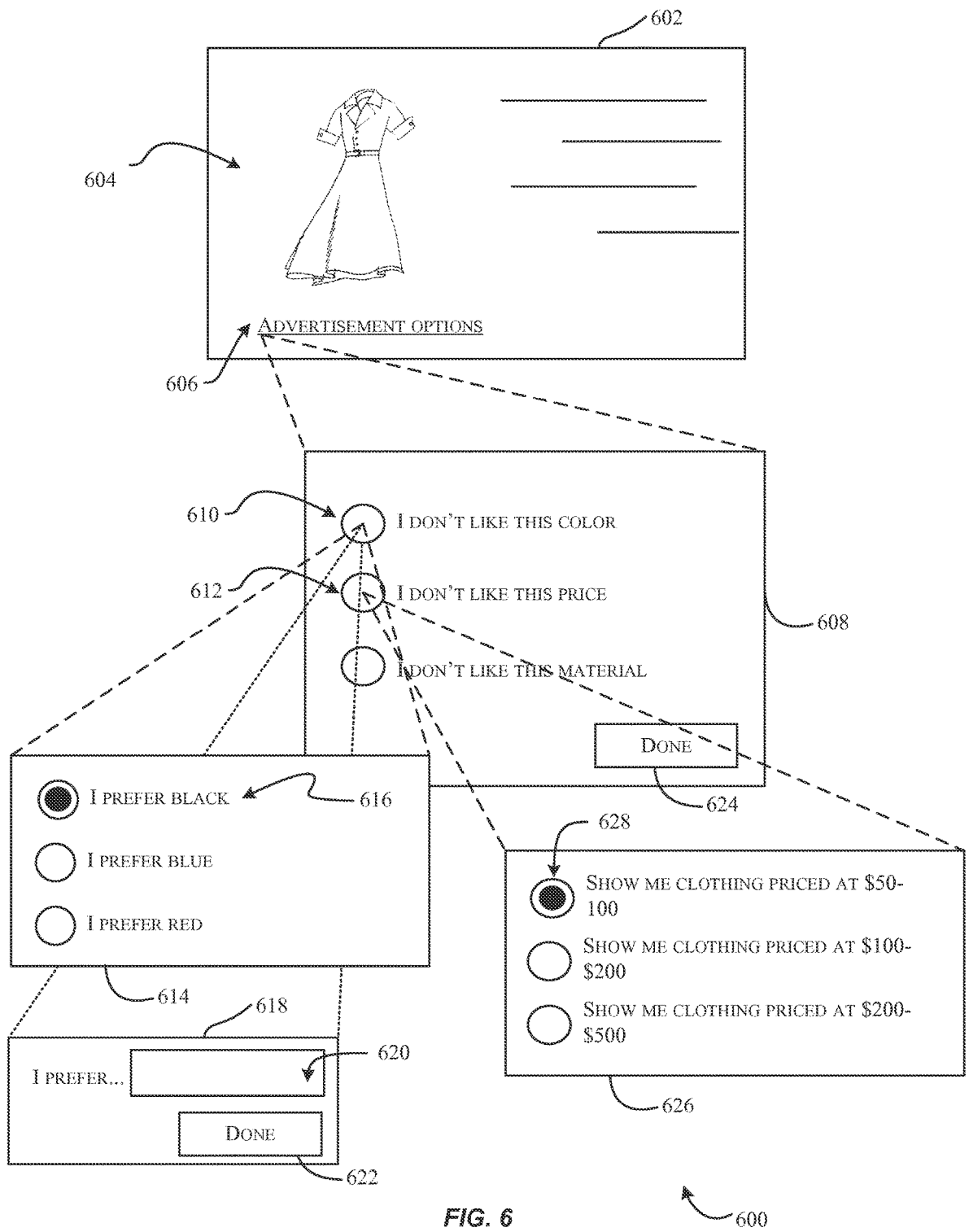
FIG. 6 illustrates an example environment provided by the advertisement management engine to capture user interest with respect to an advertisement, in accordance with still one further embodiment.

FIG. 6 illustrates an example environment 600 provided by the advertisement management engine (e.g., the advertisement management engine 102) to capture user interest with respect to an advertisement, in accordance with still one further embodiment. For example, advertisement 602, featuring a white dress 604 may be selected and provided to the user in a similar manner as described in the above examples. Hyperlink 606 may be provided to enable the user to select one or more user input options. Upon selection of hyperlink 606, dialog box 608 may be displayed to the user with a number of user input options including, but not limited to, "I don't like this color," "I don't like this price," and "I don't like this material." Such input options may be based on user information of the user, item information related to the white dress 604, and previously stored user input options selections.

As a non-limiting example, user input options may be based on item information. For example, the white dress 604 may be associated with item information including, but not limited to, one or more colors, one or more sizes, a manufacturing material, a price, a manufacturer, one or more consumer reviews, a merchant, an item feature, and the like. It may be determined from such item information that white dress 604 comes in a variety of colors and that user reviews of the product indicated that the price was too high for some and that others did not enjoy the material. Based on such information, user input options provided in dialog box 608 may be provided. Upon selection of, for example, user input option 610, a number of colors available for the item may be determined (e.g., black, blue, or red). In some cases, these user input options may be sorted by sales history associated with the item. For example, if the dress is most often purchased in black by users of the electronic marketplace, the user input options may be provided accordingly. In the example of FIG. 6, the dress is purchased most often in black, followed by blue, and finally, red.

In accordance with at least one embodiment, upon selecting user input option 610, the user may be presented with dialog box 618. Dialog box 618 may include, but is not limited to a text box 620. The user, utilizing text box 620, may input a color she prefers and select the button 622 to indicate that her input is complete. Upon receipt, for example, by user input processing engine 320, the text may be used to update user profile information stored in, for example, user profile data store 308. Thus, subsequent advertisements and subsequent user input options may utilize user interaction entered via text box 620.

In accordance with at least one embodiment, the user may select more than one user input option. For example, the user may select the user input option 610 indicating that the user would prefer clothing of a different color than the white dress 604. Information indicating the user's selection of user input option 610 may be received by the user input processing engine 320 of FIG. 3. A number of subsequent user input options may be identified based on the selection of user input option 610 and, for example, user information. For example, the user may often purchase black clothing, blue clothing, or red clothing. It may be the case that the user purchases black clothing more often than blue or red clothing. Accordingly, the user input options may be arranged according to a relevancy score as described above with the "I prefer black" user input option appearing first. These user input options may be provided to the user, for example, via dialog box 614. Alternatively, text box 620 may be provided via dialog box 618 to elicit user input. Upon selecting, for example, user input option 616, dialog box 614 may disappear, enabling the user to make a further selection from dialog box 608. Similarly, upon selection of button 622, dialog box 618 may disappear, enabling the user to make a further selection from dialog box 608. In accordance with at least one embodiment, the user may indicate that she has made all the user input options she wishes to make by selecting, for example, button 624.

Continuing with the example above, the user may make additional user input selections from dialog box 608. For example, the user may select the user input option 612 to indicate that she doesn't like the price of the white dress 604 featured in advertisement 602. The advertisement management engine 302 may receive information indicating the user's selection of user input option 612. A number of user input options may be identified based on the selection of user input option 612. For example, the user may have purchased clothing of varying prices over time. It may be the case that the user often purchases clothing in a $50-$100 price range, occasionally purchases clothing priced between $100-$200, and rarely purchases clothing priced between $200-$500. Accordingly, the user input options may be arranged according the user's purchase history. These user input options may be provided to the user, for example, via dialog box 626. Upon selecting, for example, user input option 628, dialog box 626 may disappear, enabling the user to make a further selection from dialog box 608. The advertisement management engine 302 may receive selection information regarding the user's selection of user input option 628. Such information may be utilized when determining subsequent advertisements and subsequent user input options to provide to the user. In accordance with at least one embodiment, the user may indicate that she has made all the user input options she wishes to make by selecting button 624.

Figure 7:
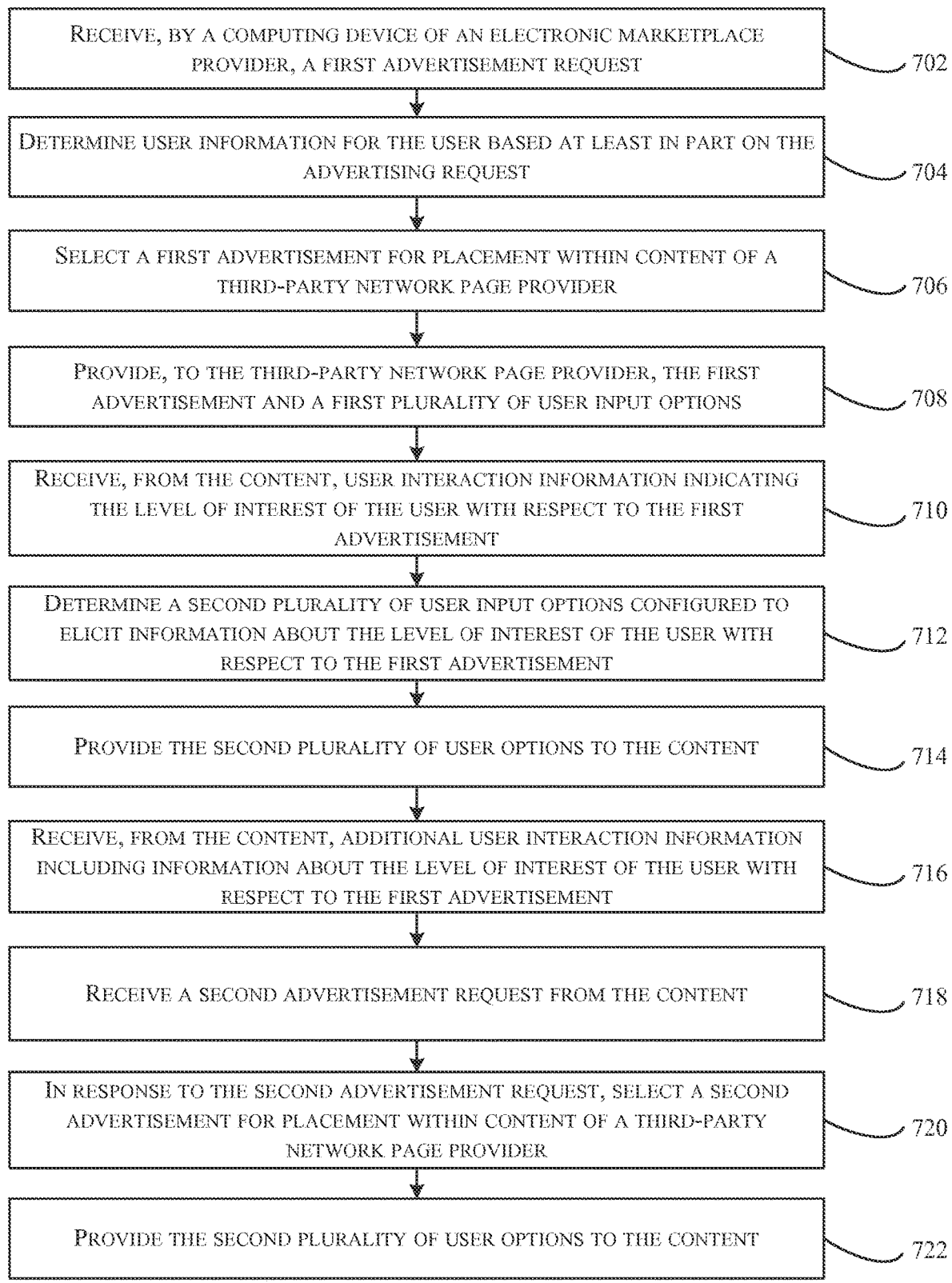
FIG. 7 is a flowchart illustrating a method for providing user input options related to an advertisement, in accordance with at least one embodiment.

FIG. 7 is a flowchart illustrating a method 700 for providing (e.g., by the advertisement management engine 302 of FIG. 3) user input options related to an advertisement, in accordance with at least one embodiment. Some or all of the method 700 (or any other processes described herein, or variations and/or combinations thereof) may be embodied in one of more software programs (e.g., advertisement management engine 302 of FIG. 3) that execute on one or more computer systems (e.g., service provider computers 330 of FIG. 3).

The method 700 may begin at block 702, where a first advertisement request that identifies the user may be received (e.g., by advertisement selection engine 318 of FIG. 3). The advertisement request may identify the user by a name, an address, or an advertisement identification number. The advertisement selection engine 318, utilizing the user identification information from the advertisement request, may determine user information for the user at block 704. Such user information may include browsing information, purchase history, and return history, or any suitable information related to the user.

At block 706, a first advertisement may be selected (e.g., by advertisement selection engine 318) for placement within content of a third-party network page provider (e.g., the webpage 106 of FIG. 1) based at least in part on an advertisement profile associated with the user information determined at block 704. In at least one example, the first advertisement may include an item offered in the electronic marketplace.

At block 708, the first advertisement and a first plurality of user input options may be provided to the third-party network page provider. In this example, the first advertisement and a first plurality of user input options may be configured to elicit a level of interest of the user with respect to the first advertisement. These user input options may be determined by option selection engine 322, for example.

At block 710, user interaction information indicating the level of interest of the user with respect to the first advertisement may be received. For example, user interaction information may be received by user input processing engine 320 of FIG. 3 from a browsing application (e.g., the browsing application 206 of FIG. 2) or any suitable source. User input processing engine 320 may utilize the user interaction information to modify user profile information. In at least one example, user input processing engine 320 may modify information stored in an advertisement profile associated with the user.

At block 712, a second plurality of user input options may be determined, for example, by option selection engine 322. The second plurality of user input options may be configured to elicit information about the level of interest of the user with respect to the first advertisement. The second plurality of input options may be determined based at least in part on the item of the first advertisement, the advertisement profile, and the user interaction information received at block 710. The second plurality of user input options may be provided to the content of third-party provider at block 714 utilizing, for example, application programming interface 316 of FIG. 3.

At block 716, additional user interaction information including information about the level of interest of the user with respect to the first advertisement may be received. For example, the additional user interaction information may be received by user input processing engine 320 from a browsing application (e.g., the browsing application 206 of FIG. 2) or any suitable source. User input processing engine 320 may utilize the additional user interaction information to modify user profile information. In at least one example, user input processing engine 320 may modify information stored in the advertisement profile associated with the user.

At block 718, a second advertisement request that identifies the user may be received, for example, by advertisement selection engine 318. In response to receiving the second advertisement request, a second advertisement may be selected by advertisement selection engine 318 at block 720. Selection of the second advertisement may be based at least in part on the user interaction information received at block 710 and the additional user interaction information received at block 716. The second advertisement may include another item offered in the electronic marketplace. At block 722, the second advertisement may be provided by a third-party network page provider.

Figure 8:
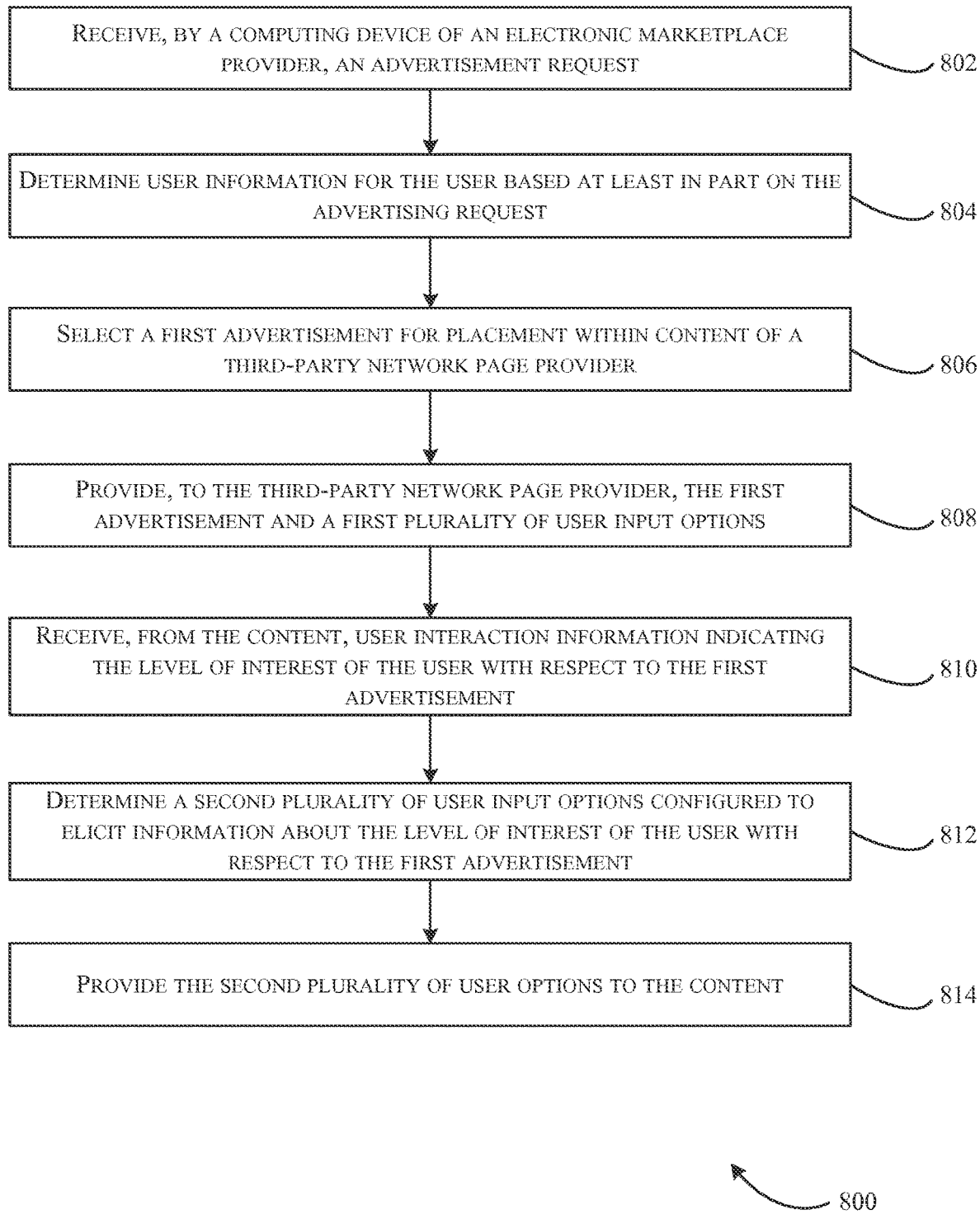
FIG. 8 is a flowchart illustrating a method for providing user input options related to an advertisement, in accordance with at least one further embodiment.

FIG. 8 is a flowchart illustrating a method 800 for providing (e.g., by the advertisement management engine 302 of FIG. 3) user input options related to an advertisement, in accordance with at least one further embodiment. The method 800 may begin at block 802, where an advertisement request that identifies the user may be received (e.g., by advertisement selection engine 318 of FIG. 3). Utilizing the user identification information from the advertisement request, advertisement selection engine 318 may determine user information for the user at block 804.

At block 806, an advertisement may be selected (e.g., by advertisement selection engine 318) for placement within content of a third-party network page provider (e.g., webpage 106 of FIG. 1). In at least one example, the advertisement includes an item offered in the electronic marketplace.

At block 808, the advertisement and a first plurality of user input options may be provided to the third-party network page provider, for example by application programming interface 316 of FIG. 3. In this example, the first plurality of user input options may be configured to elicit a level of interest of the user with respect to the first advertisement. These user input options may be determined by option selection engine 322, for example.

At block 810, user interaction information indicating the level of interest of the user with respect to the advertisement may be received, for example, by user input processing engine 320 of FIG. 3. User interaction information may be received, for example, from a browsing application (e.g., the browsing application 206 of FIG. 2) or any suitable source. User input processing engine 320 may store the user interaction information, for example, in the user profile data store 308 of FIG. 3.

At block 812, a second plurality of user input options may be determined, for example, by option selection engine 322. The second plurality of user input options may be configured to elicit information about the level of interest of the user with respect to the advertisement. The second plurality of input options may be determined based at least in part on the item of the first advertisement and the user interaction information received at block 810. The second plurality of user input options may be provided to the content of the third-party provider at block 814 utilizing, for example, application programming interface 316.

Figure 9:
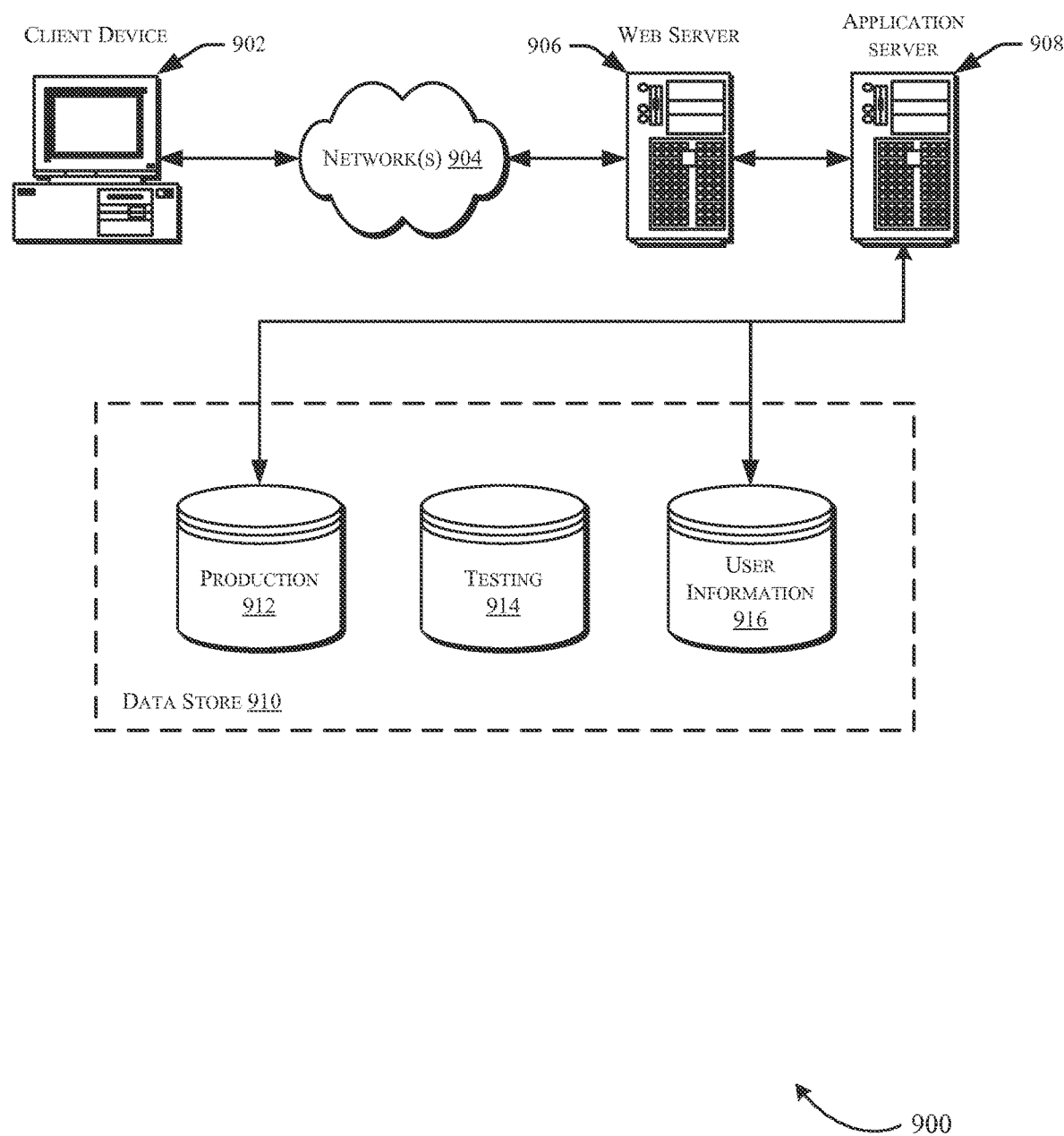
FIG. 9 is a schematic diagram illustrating an example environment for implementing aspects in accordance with at least one embodiment described herein.

FIG. 9 is a schematic diagram illustrating an example environment 900 for implementing aspects in accordance with at least one embodiment of the advertisement management engine 102 described herein. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Wired or wireless connections and combinations thereof can enable communication over the network. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of Hyper Text Markup Language ("HTML"), Extensible Markup Language ("XML"), JavaScript Object Notation ("JSON") or another appropriate structured language in this example. The handling of all requests and responses, as well as the delivery of content between the electronic client device 902 and the at least one application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above-listed mechanisms as appropriate or in additional mechanisms in the data store 910. The data store 910 is operable, through logic associated therewith, to receive instructions from the at least one application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 4. Thus, the depiction of the environment 900 in FIG. 9 should be taken as being illustrative in nature and not limiting to the scope of the disclosure.

In the following description, various embodiments of the present disclosure will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the processes described may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The non-transitory computer-readable storage medium may be random access memory, storage, etc.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

In the description above, various embodiments of the present disclosure have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

Some or all of the process described above may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z for each to be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing device of a catalog provider from a third-party network page provider, a first advertisement request that identifies a user;
   determining, by the computing device, user information for the user based at least in part on receiving the first advertisement request;
   selecting, by the computing device, a first advertisement for presentation within a network page of the third-party network page provider based at least in part on an advertisement profile associated with the user information, the first advertisement featuring a first item;
   providing, by the computing device to the third-party network page provider, the first advertisement and a graphical interface element to cause the third-party network page provider to present the graphical interface element within the first advertisement at the network page of the third-party network page provider, wherein selection of the graphical interface element indicates the user is disinterested in the first item featured in the first advertisement;
   receiving, by the computing device from the third-party network page provider, an indication that the user has selected the graphical interface element indicating disinterest in the first item of the first advertisement;
   in response to receiving the indication that the user has selected the graphical interface element indicating disinterest of the user in the first item of the first advertisement, selecting, by the computing device, a first plurality of user input options from stored user input options based at least in part on one or more characteristics of the first item being featured and at least one of i) purchase history of one or more users of the catalog provider or ii) browsing behavior of one or more users of the catalog provider, each of the first plurality of user input options corresponding to a different potential reason for the disinterest of the user in the first item of the first advertisement;
   providing, by the computing device, the first plurality of user input options to the third-party network page provider causing the third-party network page provider to present the first plurality of user input options with the first advertisement at the third-party network page;
   in response to receiving, by the computing device of the catalog provider from the third-party network page provider, an indication that a particular user input option of the first plurality of user input options presented at the third-party network page provider was selected, selecting a second advertisement featuring a second item that differs from the first item by at least one item characteristic corresponding to the user input option selected; and
   providing, by the computing device of the catalog provider, the second advertisement to the third-party network page provider causing the third-party network page provider to replace the first advertisement with the second advertisement within the network page on which the first advertisement was presented.

2. The computer-implemented method of claim 1, wherein the advertisement profile is distinct from a user profile managed by the catalog provider.

3. The computer-implemented method of claim 1, further comprising:
   providing, by the computing device, subsequent user input options to be provided on the network page on which the second advertisement is presented, the subsequent user input options being provided in response to determining the user has selected a subsequent graphical interface element indicating the user is disinterested in the second advertisement, each of the subsequent user options being selected based at least in part on one or more attributes of the first item being featured and historical purchase history or browsing behavior of one or more users of the catalog provider, each of the subsequent user options being related to another potential reason for the disinterest of the user in the second item featured in the second advertisement;
   determining, by the computing device, that at least one of the subsequent user input options was selected;
   in response to determining that the at least one of the subsequent user input options was selected, selecting, by the computing device, a subsequent advertisement for placement within the network page of the third-party network page provider based at least in part on one or more attributes corresponding to the at least one of the subsequent user input options selected; and providing, by the computing device, the subsequent advertisement to the third-party network page provider.

4. The computer-implemented method of claim 1, further comprising:
   determining, by the computing device of the catalog provider, a category of advertisements based at least in part on the first advertisement; and
   preventing, by the computing device, another advertisement of the category of advertisements from being selected as the second advertisement.

5. A computing device of a catalog provider comprising:
   a processor; and
   a memory storing computer-executable instructions that, when executed by the processor, cause the computing device to at least:
      receive an advertisement request that identifies a user;
      obtain user information for the user based at least in part on receiving the advertisement request;
      select a first advertisement presenting a first item offered in a catalog, the first advertisement being selected based at least in part on the user information;
      provide, to a third-party network page provider, the first advertisement and a graphical interface element for presentation at a network page by the third-party network page provider, the graphical interface element being presented within the first advertisement, wherein selection of the graphical interface element indicates disinterest in the first item of the first advertisement;
      receive, from the third-party network page provider, an indication that the user has selected the graphical interface element;
      in response to receiving the indication that the user has selected the graphical interface element indicating disinterest in the first item of the first advertisement, select a plurality of user input options from stored user input options based at least in part on one or more characteristics of the first item being featured and at least one of i) purchase history of one or more users of the catalog provider or ii) browsing behavior of the one or more users of the catalog provider, wherein each of the plurality of user input options corresponds to i) an item attribute and ii) a potential reason for the disinterest of the user in the first item of the first advertisement;
      provide the plurality of user input options to the third-party network page provider causing the third-party network page provider to present the plurality of user input options with the first advertisement on the network page;
      receive an indication that a user input option of the plurality of user input options has been selected;
      in response to receiving the indication that the user input option was selected, select a second advertisement featuring a second item that differs from the first item by at least one item characteristic corresponding to the user input option selected; and
      provide the second advertisement to the third-party network page provider to cause the third-party network page provider to replace the first advertisement with the second advertisement within the network page on which the first advertisement was presented.

6. The computing device of claim 5, wherein the first item and the second item have a same item category.

7. The computing device of claim 5, wherein the first item and the second item have a same color.

8. The computing device of claim 5, wherein selection of the user input option prevents a third advertisement from being selected for a period of time.

9. The computing device of claim 5, wherein the user input option relates to a first item characteristic associated with price, and wherein the second item differs in price from the first item based at least in part on the selection of the user input option.

10. The computing device of claim 5, wherein the user input option relates to a manufacturer, and wherein the second item is manufactured by a different manufacturer than a manufacturer of the first item.

11. The computing device of claim 5, wherein the user input option selected relates to a characteristic of the first item, and wherein the second advertisement is selected based at least in part on the characteristic of the second item differing from the characteristic of the first item.

12. The computing device of claim 5, wherein the second advertisement is provided to the third-party network page provider independent of a navigational action of the user.

13. The computing device of claim 12, wherein the second advertisement provided to the third-party network page provider is provided utilizing a network page script.

14. The computing device of claim 5, wherein the user information includes at least one of a browsing history, a purchase order history, or a return order history, and wherein the plurality of user input options are determined further based at least in part on the user information.

15. A non-transitory computer-readable storage medium having stored thereon computer-executable instructions that, when executed by a processor of a computing device of a catalog provider, cause the computing device to perform operations comprising:
   receiving, from a third-party network page provider, a first advertisement request that identifies a user;
   determining user information for the user in response to receiving the first advertisement request;
   selecting, based at least in part on the user information, a first advertisement for placement within a network page of the third-party network page provider, the first advertisement featuring a first item;
   providing the first advertisement and a graphical interface element for presentation at the network page by the third-party network page provider, the graphical interface element being presented within the first advertisement, wherein selection of the graphical interface element indicates the user is disinterested in the first item featured in the first advertisement;
   receiving, from the third-party network page provider, an indication that the user has selected the graphical interface element;
   in response to receiving the indication that the user has selected the graphical interface element indicating disinterest in the first item of the first advertisement, selecting, by the computing device, a first plurality of user input options from stored user input options based at least in part on one or more characteristics of the first item being featured and at least one of i) purchase history of one or more users associated with the catalog provider or ii) browsing behavior of the one or more users associated with the catalog provider, each of the first plurality of user input options corresponding to a different potential reason for the disinterest of the user in the first item of the first advertisement;

providing the plurality of first user input options to the third-party network page provider for presentation at the network page;

determining that a particular user input option of the plurality of first user input options has been selected;

in response to determining that the particular user input option was selected, selecting a second advertisement for placement within the network page of the third-party network page provider, the second advertisement including a second item that differs from the first item by at least one item characteristic corresponding to the particular user input option selected; and providing, to the third-party network page provider, the second advertisement, the providing of the second advertisement causing the third-party network page provider to replace the first advertisement and the plurality of first user input options with the second advertisement within the network page of the third-party network page provider.

16. The non-transitory computer-readable storage medium of claim 15, wherein the plurality of first user input options are selected based at least in part on at least one of a browsing history of the user, a purchase history of the user, or a user preference of the user.

17. The non-transitory computer-readable storage medium of claim 15, wherein the second advertisement is selected further based at least in part on an item type, the item type being the item characteristic corresponding to the particular user input option selected.

18. The non-transitory computer-readable storage medium of claim 17, wherein the item type is related to a manufacturer of the first item.

19. The non-transitory computer-readable storage medium of claim 15, wherein the operations further comprise scoring the plurality of first user input options based at least in part on at least one of the purchase history or browsing behavior of the one or more users of the catalog provider, and wherein the plurality of first user input options are ordered in accordance with the scoring.

* * * * *